US012067208B2

United States Patent
Lin et al.

(10) Patent No.: US 12,067,208 B2
(45) Date of Patent: Aug. 20, 2024

(54) CURSOR TEXT REPRESENTATION OF USER IN A COLLABORATIVE PLATFORM

(71) Applicant: Figma, Inc., San Francisco, CA (US)

(72) Inventors: Emily Lin, San Francisco, CA (US); Jenny Wen, San Francisco, CA (US); Heather Tompkins, San Francisco, CA (US); Jessica Wang, San Francisco, CA (US); Karl Jiang, San Francisco, CA (US); Marcin Wichary, San Francisco, CA (US); Ryan Kaplan, San Francisco, CA (US); Kee Yen Yeo, San Francisco, CA (US); Laura Pang, San Francisco, CA (US); Emily Louie, San Francisco, CA (US); Andrew Schmidt, San Francisco, CA (US); Eli Fitch, San Francisco, CA (US); Mihika Kapoor, San Francisco, CA (US)

(73) Assignee: Figma, Inc., San Francisco, CA (US)

(*) Notice: Subject to any disclaimer, the term of this patent is extended or adjusted under 35 U.S.C. 154(b) by 0 days.

(21) Appl. No.: 17/725,330

(22) Filed: Apr. 20, 2022

(65) Prior Publication Data

US 2022/0334704 A1    Oct. 20, 2022

Related U.S. Application Data

(60) Provisional application No. 63/177,226, filed on Apr. 20, 2021.

(51) Int. Cl.
G06F 3/04812    (2022.01)
G06F 8/20    (2018.01)
(Continued)

(52) U.S. Cl.
CPC .......... *G06F 3/04812* (2013.01); *G06F 8/20* (2013.01); *G06F 9/451* (2018.02); *G06Q 10/103* (2013.01)

(58) Field of Classification Search
CPC .... G06F 3/04812; G06F 9/451; G06Q 10/103
See application file for complete search history.

(56) References Cited

U.S. PATENT DOCUMENTS 6,088,709 A    7/2000    Watanabe
8,533,580 B1    9/2013    Xu
(Continued)

FOREIGN PATENT DOCUMENTS

EP    0576178    12/1993
EP    2775397 A2    9/2014
(Continued)

OTHER PUBLICATIONS

Zack Qattan, "Collaborative Cursor Chat w/Croquet", Nov. 30, 2020, youtube.com, https://www.youtube.com/watch?v=NiqTCROdlgw, pp. 1-15 (Year: 2020).*

(Continued)

*Primary Examiner* — Daniel W Parcher
(74) *Attorney, Agent, or Firm* — Mahamedi IP Law, LLP

(57) ABSTRACT

A network computer system operates to communicate instructions to a plurality of user devices. The instructions enable each of the plurality of computing devices to participate in a collaborative session where shared content is rendered on a collaborative medium, where the shared content includes graphic representations of the pointer devices of the individual users. The instructions may be further be executed to enable the individual users to modify the graphic representation of the pointer device to include text content specified by that user.

16 Claims, 11 Drawing Sheets

(51) Int. Cl.
  *G06F 9/451* (2018.01)
  *G06Q 10/10* (2023.01)

(56) References Cited

U.S. PATENT DOCUMENTS

| | | | |
|---|---|---|---|
| 9,430,229 | B1 | 8/2016 | Zijst |
| 9,477,649 | B1 | 10/2016 | Davidson |
| 10,129,188 | B2 | 11/2018 | Liu |
| 10,606,576 | B1 | 3/2020 | Tung |
| 11,010,542 | B2 | 5/2021 | Nelson |
| 2004/0054627 | A1 | 3/2004 | Rutledge |
| 2007/0118794 | A1 | 5/2007 | Hollander |
| 2010/0037149 | A1 | 2/2010 | Heath |
| 2010/0192107 | A1* | 7/2010 | Takahashi .............. G06Q 10/10 715/856 |
| 2011/0047532 | A1 | 2/2011 | Wang |
| 2011/0268262 | A1* | 11/2011 | Jones ................ H04M 3/42008 379/202.01 |
| 2013/0013089 | A1 | 1/2013 | Kawakami |
| 2013/0014023 | A1 | 1/2013 | Lee |
| 2013/0031208 | A1 | 1/2013 | Linton |
| 2013/0097476 | A1 | 4/2013 | Koroda |
| 2013/0111338 | A1* | 5/2013 | Huo ...................... G06F 40/166 715/780 |
| 2013/0124967 | A1 | 5/2013 | Hatfield |
| 2014/0108963 | A1 | 4/2014 | Black |
| 2014/0258968 | A1 | 9/2014 | Brown |
| 2014/0298153 | A1 | 10/2014 | Tsujimoto |
| 2014/0310660 | A1 | 10/2014 | Rosen |
| 2015/0032366 | A1 | 1/2015 | Man |
| 2015/0127753 | A1* | 5/2015 | Tew ................... G06Q 30/0251 709/206 |
| 2015/0302338 | A1 | 10/2015 | Zaveri |
| 2016/0110063 | A1 | 4/2016 | Connolly |
| 2016/0232785 | A1 | 8/2016 | Wang |
| 2016/0343156 | A1 | 11/2016 | Yoshizawa |
| 2016/0358467 | A1 | 12/2016 | Jeong |
| 2017/0109139 | A1 | 4/2017 | Bitner |
| 2017/0293544 | A1 | 10/2017 | Katayama |
| 2017/0339370 | A1* | 11/2017 | Inoue ...................... H04N 5/44 |
| 2018/0121039 | A1 | 5/2018 | Bliss |
| 2018/0173701 | A1 | 6/2018 | Kim |
| 2018/0174446 | A1 | 6/2018 | Wang |
| 2018/0285084 | A1 | 10/2018 | Mimlitch, III |
| 2018/0315248 | A1 | 11/2018 | Bastov |
| 2018/0337880 | A1 | 11/2018 | Sokolov |
| 2018/0350144 | A1 | 12/2018 | Rathod |
| 2019/0129927 | A1 | 5/2019 | Okamoto |
| 2019/0179501 | A1 | 6/2019 | Seeley |
| 2019/0179602 | A1 | 8/2019 | Lo |
| 2019/0236975 | A1 | 8/2019 | Chong |
| 2019/0303880 | A1* | 10/2019 | Hashimoto ............ G06Q 10/02 |
| 2020/0296147 | A1* | 9/2020 | Eliason ................. H04L 65/403 |
| 2021/0208775 | A1* | 7/2021 | Allington .............. G06F 3/0486 |
| 2022/0108276 | A1* | 4/2022 | Stringham ............ G06F 3/0481 |
| 2022/0191594 | A1 | 6/2022 | Devoy, III |
| 2022/0263675 | A1* | 8/2022 | Cupala ............... G06Q 10/1095 |
| 2022/0334806 | A1 | 10/2022 | Lin |
| 2022/0342644 | A1 | 10/2022 | Fuetsch |

FOREIGN PATENT DOCUMENTS

| | | |
|---|---|---|
| EP | 3293619 | 3/2018 |
| EP | 3633472 A1 | 4/2020 |
| WO | WO-2009/132444 A1 | 11/2009 |
| WO | WO-2019/209391 A1 | 10/2019 |
| WO | WO-2021/097141 | 5/2021 |
| WO | WO-2021/159079 | 8/2021 |
| WO | WO-2022/061027 | 3/2022 |
| WO | WO-2022/109200 | 5/2022 |

OTHER PUBLICATIONS

International Search Report and The Written Opinion of The International Searching Authority mailed Jul. 1, 2022, for related PCT/US2022/025626, filed Apr. 20, 2022, 17 pages.
Wallace Evan: "Multiplayer Editing in Figma", figma.com/blog, Sep. 28, 2016 (Sep. 28, 2016), XP055930547, Retrieved from the Internet: URL: https://www.figma.com/blog/multiplayer-editing-in-figma/ [retrieved on Jun. 13, 2022] the whole document, 7 pages.
Anonymous: "Change cursor into custom text", Dec. 24, 2018 (Dec. 24, 2018), XP055930588, Retrieved from the Internet: URL: https://stackoverflow.com/questions/53916492/change-cursor-into-custome-text [retrieved on Jun. 13, 2022] the whole document, 2 pages.
International Search Report and The Written Opinion of The International Searching Authority mailed Jul. 25, 2022, for related PCT/US2022/025840 filed Apr. 20, 2022, 17 pages.
Paper by WeTransfer—Simple Sketch App, "Creativity at your fingertips" URL:https://web.archive.org/web/20220121205009/https://wetransfer.com/paper, 9 pages.
International Search Report and The Written Opinion of The International Searching Authority mailed Feb. 1, 2023, for related PCT/US2022/047191 filed Oct. 19, 2022, 16 pages.
International Search Report and The Written Opinion of The International Searching Authority mailed Mar. 1, 2023 for related PCT/US2022/050134 filed Nov. 16, 2022, 10 pages.
Philippe Charles et al.: "Accelerating the creation of customized, language-specific IDEs in Eclipse", ACM SIGPLAN Notices, Association for Computing Machinery, US, vol. 44, No. 10, Oct. 25, 2009 (Oct. 25, 2009), pp. 191-206, XP058304685; ISSN: 0362-1340, DOI: 10.1145/1639949.1640104; p. 192, right-hand col. line 25-35, p. 196, right-hand col. line 6-13, abstract.

* cited by examiner

CURSOR TEXT REPRESENTATION OF USER IN A COLLABORATIVE PLATFORM

RELATED APPLICATIONS

This application claims benefit of priority to provisional U.S. Patent Application No. 63/177,226, filed Apr. 20, 2021; the aforementioned priority application being hereby incorporated by reference in its entirety for all purposes.

TECHNICAL FIELD

Examples described herein relate to an online collaboration platform, and more specifically, to an online collaboration platform that provides multiple design application services.

BACKGROUND

Software design tools have many forms and applications. In the realm of application user interfaces, for example, software design tools require designers to blend functional aspects of a program with aesthetics and even legal requirements, resulting in a collection of pages which form the user interface of an application. For a given application, designers often have many objectives and requirements that are difficult to track.

DETAILED DESCRIPTION

Figure 1A:
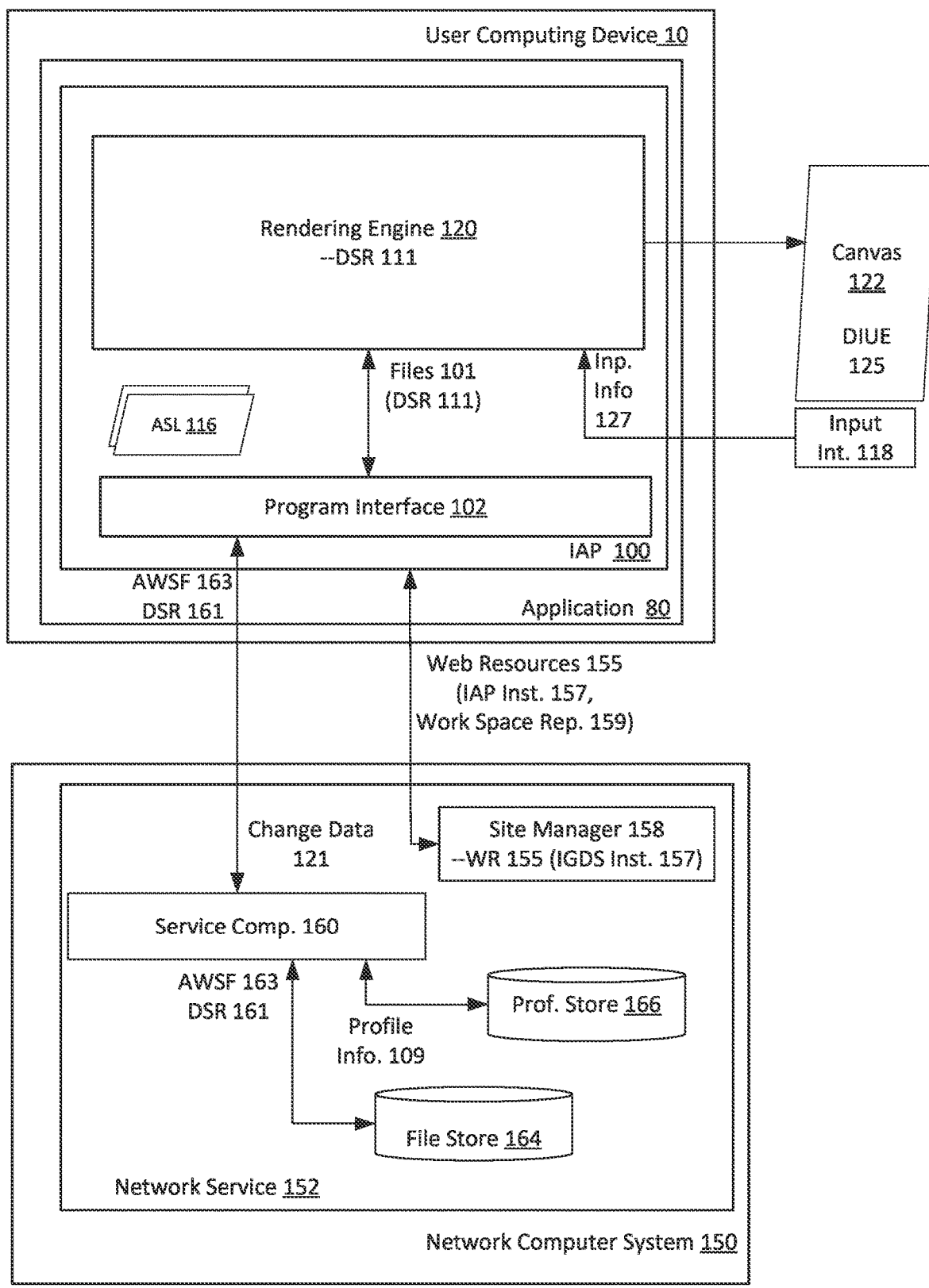
FIG. 1A illustrates a network computing system to implement an interactive graphic application platform, according to one or more examples.

Examples include a computing system that can operate to implement an interactive collaborative application platform that enables users to collaborate on graphic design and other types of content creation using different design application services.

According to examples, a network computer system operates to enable multiple user computing devices to utilize any one of multiple collaborative applications where users contribute content to a shared medium. In some examples, the network computer system enables multiple user computing devices to utilize one or more collaborative application services to create and update shared content and resources (e.g., a workspace file). The network computer system can store the updated workspace file in connection with an account associated with a user of the first user computing device.

In a collaborative environment, the network computer system detects changes to an instance of a workspace on the computing devices of a given user in a group of collaborators. The network computer system then propagates the detected changes in real-time (or near real-time) to instances of the workspace file on computing devices of other users in the group of collaborators.

In examples, a computing system is configured to implement an interactive collaborative application platform for utilizing multiple application services for creating designs and other types of visual content. Examples of application services include (i) a design interface application to create a design user interface, such as used by user-interface designers ("UI designers"), web designers, and web developers; and (ii) a whiteboarding application to create a whiteboard design.

In some examples, a network computer system is provided to include memory resources store a set of instructions, and one or more processors are operable to communicate the set of instructions to a plurality of user devices. The set of instructions can be communicated to user computing devices, in connection with the user computing devices being operated to render a corresponding type of collaborative content on a canvas, where the collaborative content can be edited by user input that is indicative of any one of multiple different input actions. As described by various examples, the instructions and data communicated to the computing devices enable the respective computing devices to select one of multiple application services to access, view and edit collaborative content rendered on a shared canvas or other collaborative medium. In some examples, the collaborative or shared content can correspond to a design interface (or design under edit), whiteboard content or other visual content.

As used herein, the term "whiteboard" (or "whiteboarding" or variants thereof) relates to content that is primarily centered about recreating digitally the types of content individuals could manually create in a corresponding physical environment, using a real-world whiteboard or similar apparatus (e.g., chalkboard). For example, whiteboard content can include tools for creating shapes, text, scribbles, or content that can be placed onto a surface of the whiteboard (e.g., sticky note).

Still further, in examples, a network computer system operates to communicate instructions to a plurality of user devices. The instructions enable each of the plurality of computing devices to participate in a collaborative session where shared content is rendered on a collaborative medium, including enabling a user of corresponding user to utilize a corresponding pointer device to interact with the collaborative medium. The instructions may be executed on each of the plurality of computing devices to generate shared content that includes a graphic representation of the pointer device used by the respective user. Each user can further modify the graphic representation of the pointer device to include text content specified by that user.

Still further, in some examples, a network computer system enables a collaborative session where individual participants can have their respective cursors (or graphic representation of pointer device) modified to include user-specified text content. In some variations, the text content can be ephemeral, so as to automatically disappear. In variations, the text content can remain until the user provides input to remove or change the content. Still further, in some variations, individual users can have the text content copied onto a canvas of the shared content. As an addition or variation, the cursor text content can include embedded keywords or commands which when detected, cause operations that affect the collaborative session and/or the shared content of the collaborative session.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1A illustrates a network computing system to implement an interactive application platform on a user computing device, according to one or more examples. A network computing system such as described with an example of FIG. 1A can be implemented using one or more servers which communicate with user computing devices over one or more networks. In examples, the network computing system 150 performs operations to enable an interactive application platform ("IAP 100") to be implemented on user computing devices 10. In examples, the IAP 100 can be implemented by the user initiating a session (e.g., user accessing a website) to receive programmatic resources of the IAP 100. A browser component executes the programmatic resources to implement the IAP 100, with functionality to receive user input and to render content that is based on or responsive to user input. As described, the IAP 100 is implemented to enable the user to create various types of content, such as interactive graphic designs, art, whiteboard content, program code renderings, presentations, and/or textual content. As further described, the IAP 100 can include logic ("ASL 116") for implementing one or more application services, where each application service is implemented through the IAP 100 to provide a corresponding set of functionality and user experience. The IAP 100 also implements the application services to share some resources, such as the canvas, workspace file or library of design elements. Further, the IAP 100 enables multiple application services to be used during a given online session and/or with respect to a particular application service.

According to examples, a user of computing device 10 operates web-based application 80 to access a network site, where programmatic resources are retrieved and executed to implement the IAP 100. The web-based application 80 can execute scripts, code and/or other logic (the "programmatic components") to implement functionality of the IAP 100. In examples, the web-based application 80 can correspond to a commercially available browser, such as GOOGLE CHROME (developed by GOOGLE, INC.), SAFARI (developed by APPLE, INC.), and INTERNET EXPLORER (developed by the MICROSOFT CORPORATION). In such examples, the processes of the IAP 100 can be implemented as scripts and/or other embedded code which web-based application 80 downloads from a network site. For example, the web-based application 80 can execute code that is embedded within a webpage to implement processes of the IAP 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., web-page structured in accordance with HTML 5.0 or other versions, as provided under standards published by W3C or WHATWG consortiums). In some examples, the rendering engine 120 may utilize graphics processing unit (GPU) accelerated logic, such as provided through WebGL (Web Graphics Library) programs which execute Graphics Library Shader Language (GLSL) programs that execute on GPUs.

The IAP 100 can be implemented as part of a network service, where web-based application 80 communicates with one or more remote computers (e.g., server used for a network service) to executes processes of the IAP 100. The web-based application 80 retrieves some or all of the programmatic resources for implementing the IAP 100 from a network site. The web-based application 80 may also access various types of data sets in providing the IAP 100. The data sets can correspond to files and design libraries (e.g., pre-designed design elements), which can be stored remotely (e.g., on a server, in association with an account) or locally. In examples, the network computer system 150 provides a shared design library which the user computing device 10 can use with any of the application services provided through the IAP 100. In this way, the user may initiate a session to implement the IAP 100 for purpose of creating or editing the workspace file, as rendered on the canvas 122, in accordance with one of multiple collaborative application services of the IAP 100.

In examples, the IAP 100 includes a program interface 102, an input interface 118 and a rendering engine 120. The program interface 102 can include one or more processes which execute to access and retrieve programmatic resources from local and/or remote sources. In an implementation, the program interface 102 can generate, for example, a canvas 122, using programmatic resources which are associated with web-based application 80 (e.g., HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with canvas 122. The application framework can include data sets which define or configure, for example, a set of interactive graphic tools that integrate with the canvas 122 and which comprise the input interface 118, to enable the user to provide input to generate or update content rendered on the canvas 122.

According to some examples, the input interface 118 can be implemented as a functional layer that is integrated with the canvas 122 to detect and interpret user input. The input interface 118 can, for example, process a user's interaction with an input mechanism (e.g., pointer device, keyboard) of the user computing device, to detect, for example, cursor positioning/movement with respect to the canvas 122, hover input (e.g., pre-selection input), selection input (e.g., clicks or double clicks), shortcuts (e.g., key board inputs) and other inputs. In processing a user's interaction with a pointer device, the input interface 118 can use a reference of the canvas 122 to identify a screen location of a user's cursor as the user moves or otherwise interacts with the pointer device. Additionally, the input interface 118 can interpret an input action of the user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the user can specify (e.g., right-click, screen-tap, etc.) through one or more input devices. In such examples, the input interface 118 can interpret, for example, a series of inputs as a design tool selection (e.g., shape selection based on location of input), as well as inputs to define attributes (e.g., dimensions) of a selected shape. In other examples, the input interface 118 can interpret a continuous input (corresponding to a continuous movement of the user's pointer device) as selecting a tool (e.g., shape too) and canvas location where an output of the selected tool is to appear.

In some examples, the IAP 100 includes application service logic 116 to enable multiple application services to be utilized during a given user session, where each application service provides the user with a particular functionality and/or user experience. As described by some examples, each application service is implemented by the IAP 100 utilizing a corresponding application service logic 116 to configure the interface component 118, rendering engine 120 and/or other components of the IAP 100 to provide the functionality and user experience of the corresponding application service. In this way, the IAP 100 enables the user to operate multiple application services during one online session. Further, the different application services can share resources, including programmatic resources of the IAP 100, such as canvas 122. In this way, each application service can contribute content to and/or utilize features and content provided with the canvas 122 during a given session. Still further, the application services can be implemented as alternative modalities of IAP 100, such that the user can toggle between modes, where each mode provides a particular functionality and user experience. In examples, each application service can utilize a common workspace file associated with the user. By default, a computing device that opens the workspace file can utilize a default application service to access and/or update that workspace file. The user may also switch the mode of operation of the IAP 100 to utilize a different application service to access, use and/or update the workspace file.

The network computing system 150 can include a site manager 158 to manage a website where a set of web-resources 155 (e.g., web page) are made available for the web-based application 80 of user computing devices 10. The web-resources 155 can include instructions, such as scripts or other logic ("ICAP instructions 157"), which are executable by browsers or web components of user computing devices. The web resources 155 can also include (i) resources that are to be shared as between application services, provided to the user computing devices in connection with the user computing devices utilizing either of the application services, and (ii) application specific resources, which execute on the user computing devices for a particular one of the available application services. The web resources 155 can also include a design library of design elements that is partially or fully shared as between the application services. The library of design elements can enable the user to select predetermined design elements for use on the canvas 122 in connection with the user utilizing either of the application services.

In some variations, once the computing device 10 accesses and downloads the web-resources 155, web-based application 80 executes the IAP instructions 157 to implement functionality as described with examples. For example, the IAP instructions 157 can be executed by web-based application 80 to initiate the program interface 102 on the user computing device 10. The initiation of the program interface 102 may coincide with the establishment of, for example, a web-socket connection between the program interface 102 and a service component 160 of the network computing system 150.

In some examples, the web-resources 155 includes logic which web-based application 80 executes to initiate one or more processes of a program interface 102, causing the IAP 100 to retrieve additional programmatic resources and data sets for implementing functionality as described by examples. The web resources 155 can, for example, embed logic (e.g., JAVASCRIPT code), including GPU accelerated logic, in an HTLM page for download by computing devices of users. The program interface 102 can be triggered to retrieve additional programmatic resources and data sets from, for example, the network service 152, and/or from local resources of the computing device 10, in order to implement each of the multiple application services of the IAP 100. For example, some of the components of the IAP 100 can be implemented through web-pages that can be downloaded onto the computing device 10 after authentication is performed, and/or once the user performs additional actions (e.g., download one or more pages of the workspace associated with the account identifier). Accordingly, in examples as described, the network computing system 150 can communicate the IAP instructions 157 to the computing device 10 through a combination of network communications, including through downloading activity of web-based application 80, where the IAP instructions 157 are received and executed by web-based application 80.

The computing device 10 can use web-based application 80 to access a website of the network service 152 to download the webpage or web resource. Upon accessing the website, web-based application 80 can automatically (e.g., through saved credentials) or through manual input, communicate an account identifier to the service component 160. In some examples, web-based application 80 can also communicate one or more additional identifiers that correlate to a user identifier.

Additionally, in some examples, the service component 160 can use the user or account identifier of the user identifier to retrieve profile information 109 from a user profile store 166. As an addition or variation, profile information 109 for the user can be determined and stored locally on the user's computing device 10.

The service component 160 can also retrieve the files of an active workspace ("active workspace files 163") that are linked to the user account or identifier from a file store 164. The profile store 166 can also identify the workspace that is identified with the account and/or user, and the file store 164 can store the data sets that comprise the workspace. The data sets stored with the file store 164 can include, for example, the pages of a workspace and one or more data structure representations 161 for the design under edit which is renderable from the respective active workspace files.

As an addition or variation, each file can be associated with metadata that identifies the application service that was used to create the particular file. In some examples, the metadata identifies the default application service for viewing, utilizing or otherwise updating the application service.

Additionally, in examples, the service component 160 provides a representation 159 of the workspace associated with the user to the web-based application 80, where the representation identifies, for examples, individual files associated with the user and/or user account. The workspace representation 159 can also identify a set of files, where each file includes one or multiple pages, and each page including objects that are part of a design interface.

On the user device 10, the user can view the workspace representation through web-based application 80, and the user can elect to open a file of the workspace through web-based application 80. In examples, upon the user electing to open one of the active workspace files 163, web-based application 80 initiates the canvas 122. For example, the IAP 100 can initiate an HTML 5.0 canvas as a component of web-based application 80, and the rendering engine 120 can access one or more data structures representations 111 of content rendered on the canvas 122.

The IAP 100 utilizes application service logic 116 to implement multiple modes of operation, where each mode corresponds to an application service. As described, the application service logic 116 associated with each service application can include instructions and data for configuring the components of IAP 100 to include functionality and features of the corresponding application service. Accordingly, the application service logic 116 can, for example, configure the application framework and/or input interface 118 to differ in form, functionality and/or configuration as between the alternative modes of the IAP 100. Additionally, the type of actions and interactions which the user can perform to register input can vary based on the modes of operation. Still further, the different modes of operation can include different input or user-interface features for the user to select and use for inclusion on the canvas 122. By way of example, when the IAP 100 is operating in a mode for whiteboarding service application, the program interface 102 can provide input features to enable a user to select a design element that is in the form of a "sticky note," while in an alternative mode for an interactive graphic design service application, the "sticky note feature" is not available. However, in the alternative mode, the user may be able to select anyone of numerous possible shapes or previously designed objects which the user can write textual messages in for display on the canvas 122.

Additionally, the application service logic 116 can configure the operation of the rendering engine 120, such that the functionality and behavior of the rendering engine 120 differs as between different application services. In this way, the rendering engine 120 functions to provide alternative behaviors for different modes of operation, coinciding with the particular service application that is active. By way of example, the configuration of the rendering engine 120 can affect the appearance of the canvas 122, the appearance (e.g., visual attributes) of rendered content elements on the canvas 122, the behavior or representation of user interaction (e.g., whether the user cursor or pointe device is represented on the canvas 122), the type or specific content that is rendered, the physic engine that is used by the rendering engine to represent dynamic events (e.g., the object being moved), what user operations can be performed (e.g., whether select objects can be resized), and the like.

Additionally, each of the application services can utilize a shared library of content elements (e.g., graphic design element), as well as core functionality that enables design elements to be shared and updated between the different application services that are available through the platform. Additionally, the workspace file created and edited through use of one application service can be utilized with the other application service. Moreover, the transition between application services can be seamless—for example, the user computing device 10 can open a workspace file using the first application service (e.g., interactive graphic design application service for UIX design) then seamlessly switch to using the second application service (e.g., whiteboarding application service) with the same file, without closing the workspace file. In such example, each application service enables the user to update the workspace file even while the workspace file is in use by other computing devices (e.g., such as in a collaborative environment). In such examples, the user can mode switch the IAP 100 to switch which application service is in use, with each application service utilizing the workspace file.

Figure 1B:
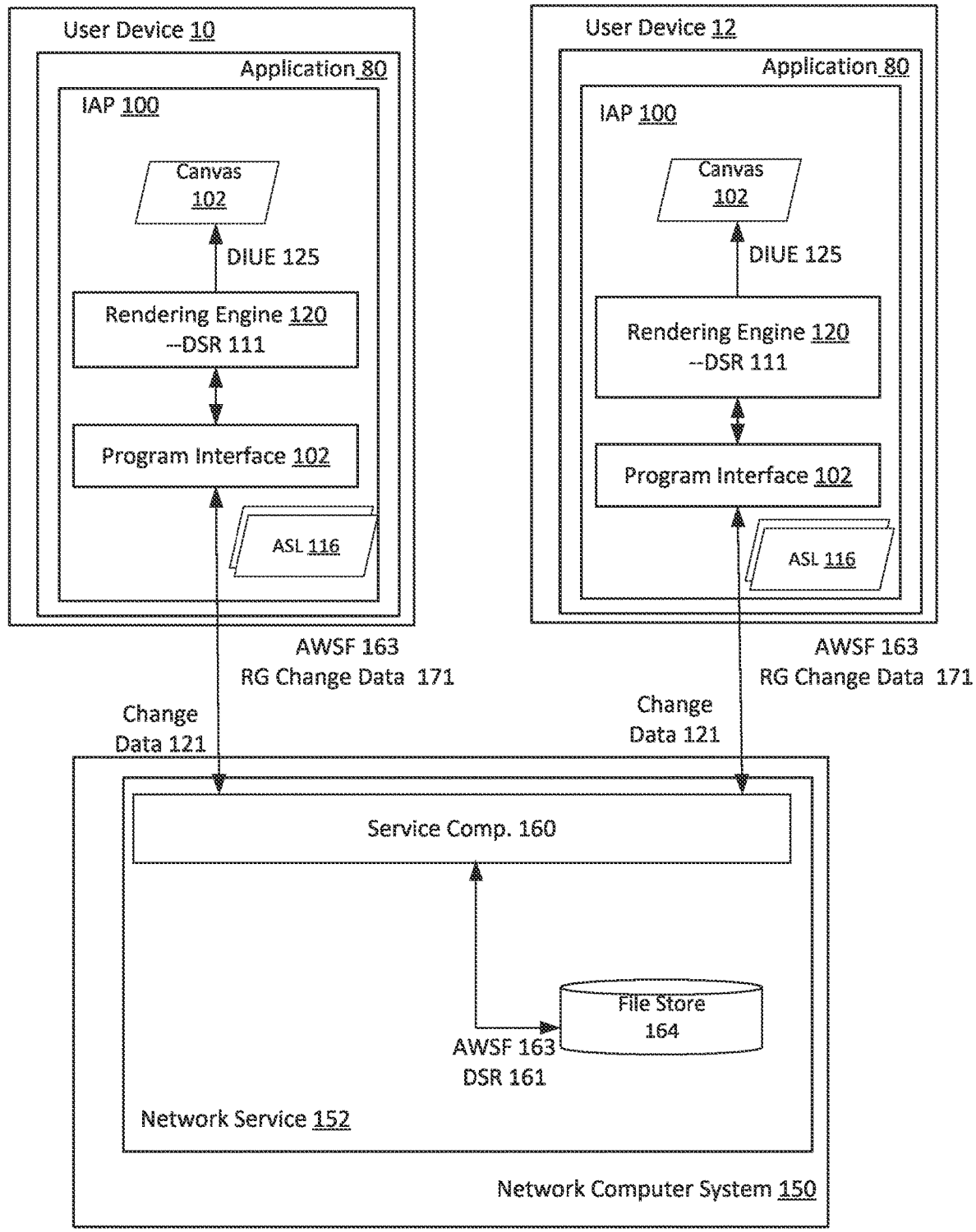
FIG. 1B illustrates a network computing system to implement an interactive graphic application platform for multiple users in a collaborative network platform, according to one or more examples.

FIG. 1B illustrates a network computing system to provides an interactive application platform for multiple users in a collaborative environment, according to one or more examples. In an example of FIG. 1B, a collaborative network platform is implemented by the network computing system 150, which communicates with multiple user computing devices 10, 12 over one or more networks (e.g., World Wide Web) to implement the IAP 100 on each computing device. While FIG. 1B illustrates an example in which two users utilize the collaborative network platform, examples as described allow for the network computing system 150 to enable collaboration on design interfaces amongst a larger group of users.

In an example of FIG. 1B, multiple computing devices 10, 12 initiate a collaborative session, where each computing device 10, 12 implements a version or instance of the IAP 100. The network computing system 150 communicates with each computing device 10, 12 over one or more networks (e.g., World Wide Web) to enable the computing devices to collaborate. In particular, the network computing system 150 implements the IAP 100 on individual computing devices 10, 12, and enables each computing device 10, 12 to create, update or interact with a shared canvas 122

With respect to FIG. 1B, the user computing devices 10, 12 can be assumed as being operated by users that are associated with a common account, with each user computing device 10, 12 implementing a corresponding IAP 100 to access the same workspace during respective sessions that overlap in time with one another. Accordingly, each of the user computing devices 10, 12 may access the same set of active workspace files 163 at the same time, with the respective program interface 102 of the IAP 100 on each user computing device 10, 12 operating to establish a corresponding communication channel (e.g., web socket connection) with the service component 160.

The service component 160 can communicate a copy of the active workspace files 163 to each user computing device 10, 12, such that the computing devices 10, 12 render an active workspace file 163 at the same time. In some examples, an active workspace file 163 can be associated with a default application service, and each computing device 10, 12 can open the active workspace file 163 using the associated (or default) application service. Still further, in other variations, pages or portions of the workspace file can be associated with different application services.

Each of the computing devices 10, 12 can maintain a local data structure representation 111 of the content rendered on the canvas 122, which may be based at least in part on the selected workspace file. The service component 160 can also maintain a network-side data structure representation 161 which can initially be obtained from the files of the active workspace 163 and maintained through communication with each of the computing devices 10, 12 during a collaborative session. In this way, the network-side data structure can coincide with the local data structure representations 111 on each of the computing devices 10, 12.

In some examples, the user of the computing devices 10, 12 can switch the operational mode of the IAP 100 so as to view and update the workspace using a non-default application service. Thus, in some variations, the active workspace file can be updated by the users utilizing either of the application services.

By way of example, during a collaboration session, users can view and edit a shared workspace file using, for example, either a graphic design application service or a whiteboarding application service. The network computer system 150 can detect changes made by users that utilize either of the graphic design application service or whiteboarding application service, and the network computer system 150 can propagate detected changes on any one of the user computing devices to the other user computing devices. Further, individual users that participate in the collaborative environment can download and open the workspace file using a default application service (e.g., whiteboarding application service), then switch to the other design application service without closing the workspace file. Accordingly, in some examples, the IAP 100 is implemented to provide application services that utilize shared resources (e.g., workspace, design library). In some examples, a shared workspace can include components or segments (such as pages or other logically distinct segments of a workspace) that are associated with different application services. Thus, for example, one page (or other segment) of a workspace file can be associated with a graphic design application service by default, while another page may be associated with a whiteboarding application service. The default designation of the application service can correlate to the mode of operation that the IAP 100 utilizes to enable the corresponding user to access the page. Still further, while some examples provide that the IAP 100 can switch modes to enable the user to view and/or edit a page or other segment of a workspace using a non-default application service, in variations, the IAP can be implemented in a manner that precludes pages or segments of the workspace from, depending on implementation, being viewed (e.g., read access) or updated (e.g., write access) through an application service other than the default application service, while other pages or segments of the workspace file can be accessed through either of the application services. Thus, in some variations, the IAP 100 can be implemented to restrict portions of a shared resource (e.g., page or segment of a workspace file) from being accessible through an application service other than the default application service. Still further, in other examples, the IAP 100 can be implemented to selectively limit (e.g., based on settings, such as specified by admin user) the ability of certain users (e.g., users of a particular class or role) from using an application service other than the default application service to either view or update a shared resource (e.g., workspace, library of content elements, etc.) or portion thereof of the shared resource. By way of illustration, in the case of a library of design elements, all users associated with an account my access the library to select content elements from the design library for rendering on a collaborative medium, using either of the application services. However, only users of a specific role (e.g., "graphic design user") may be permitted to create a new or updated design element to be stored with the shared design library. Further, in some variations, the ability of such users to create or update the content element may also be selectively limited to allow for changes which are made through one of the application services (e.g., the default application service) but not the other. In this way, the IAP 100 can configure the manner in which application services are utilized with shared resources, as described in examples and other variations.

In some examples, the web resources 155 include or provide a given workspace file that includes a library of design elements which may be made available to one or multiple application services. Still further, in examples, the design elements library can be updated by users using either of the application services provided through the IAP 100. Moreover, in some variations, changes made by individual users to design elements of the library can be propagated to (i) instances of the library provided to other user computing devices (e.g., such as users of a collaborative session or users who subsequently access the library), and/or (ii) the content and/or interfaces rendered on the canvas 122 of other users which participate in different collaborative sessions and utilize the particular design element.

To illustrate the latter variation, a user of a collaborative session can update a design element of the library that is used in connection with an active workspace file of a collaborative session. Further, in variations, the user can update the library using either of the application services. If the design element is in use on the design interface that is shared during the collaborative session, the change to the design element as stored with the design library can be automatically detected by the network computer system 150, and the change can be propagated to (i) each instance of the library that is downloaded to the user computers, (ii) the design element as rendered on the canvas 122 of the individual users of the collaborative session, and (iii) the design element as rendered on the canvas 122 of other users who are not participating in the collaborative session.

The network computing system 150 and each computing device 10, 12 that is participating in the collaborative session can maintain a data representation of the shared content. In some examples, the shared content can reflect content that is generated from, for example, user interactions, such as cursor elements. Content such as depiction of cursor elements may be shared for one application service (e.g., whiteboarding), but not the other application service.

In such examples, when a user operating a computing device moves the cursor, the user's computing device can update the local data representation of the shared content to reflect the change in the user's cursor. Each computing devices 10, 12 can generate change data that reflects changes to the local data representation 111 maintained on the respective computing device 10, 12, as a result of changes the user makes to the shared content, where those changes include cursor movements and actions of the user. Each computing device 10, 12 can stream change data to the network computing system 150, which in turn updates the network's representation 161 of the shared content. The network computing system 150 can reconcile change data received from the various computing devices to update the network's representation of the shared content. The network computing system 150 then streams an updated representation of the shared content to each of the computing devices that participated in the collaborative session.

The network computing system 150 can continuously synchronize the shared content and/or active workspace files 163 on each of the user computing devices. In particular, changes made by users to shared content and/or a selected active workspace file 163 on one computing device 10, 12 may be immediately (i) reflected in the respective data structure representation 161 of the workspace file, and (ii) rendered on the other user computing device 10, 12. By way of example, the user of computing device 10 can make changes to shared content that affects a corresponding respective workspace file. Alternatively, the user of the computing device 10 can interact with the shared canvas 122 in a manner where the content is changed, without any change being needed to the workspace file. For example, the user can generate ephemeral text content (e.g., cursor text) that is linked to the cursor element, representing the user's pointer device and interaction with the canvas 102. In examples, the local data structure representation 111 is updated to reflect the update to the workspace file and/or shared content. From the computing device 10, the program interface 102 of the IAP 100 can stream change data 121, reflecting the change of the user input, to the service component 160. The service component 160 processes the change data 121 of the user computing device. The service component 160 can use the change data 121 to make a corresponding change to the network-side data structure representation 161. The service component 160 can also stream remotely-generated change data 171 (which in the example provided, corresponds or reflects change data 121 received from the user device 10) to the computing device 12, to cause the corresponding IAP 100 to update the workspace file as rendered on the other device. The computing device 12 may also use the remotely generated change data 171 to update with the local data structure representation 111 of that computing device 12. The program interface 102 of the computing device 12 can receive the update from the network computing system 150, and the rendering engine 120 can update the workspace file and the respective local copy of 111 of the computing device 12.

The reverse process can also be implemented to update the data structure representations 161 of the network computing system 150 using change data 121 communicated from the second computing device 12 (e.g., corresponding to the user of the second computing device updating the shared content and/or workspace file as rendered on the second computing device 12). In turn, the network computing system 150 can stream remotely generated change data 171 (which in the example provided, corresponds or reflects change data 121 received from the user device 12) to update the local data structure representation 111 of the workspace file on the first computing device 10. In this way, the workspace file of the first computing device 10 can be updated as a response to the user of the second computing device 12 providing user input to change the workspace file.

To facilitate the synchronization of the data structure representations 111, 111 on the computing devices 10, 12, the network computing system 150 may implement a stream connector to merge the data streams which are exchanged between the first computing device 10 and the network computing system 150, and between the second computing device 12 and the network computing system 150. In some implementations, the stream connector can be implemented to enable each computing device 10, 12 to make changes to the network-side data representation 161, without added data replication that may otherwise be required to process the streams from each device separately.

Additionally, over time, one or both of the computing devices 10, 12 may become out-of-sync with the server-side data representation 161. In such cases, the respective computing device 10, 12 can redownload the active workspace files 163, to restart the its maintenance of the data structure representation 111 of the workspace file that is rendered and edited on that device.

Methodology

Figure 2A:
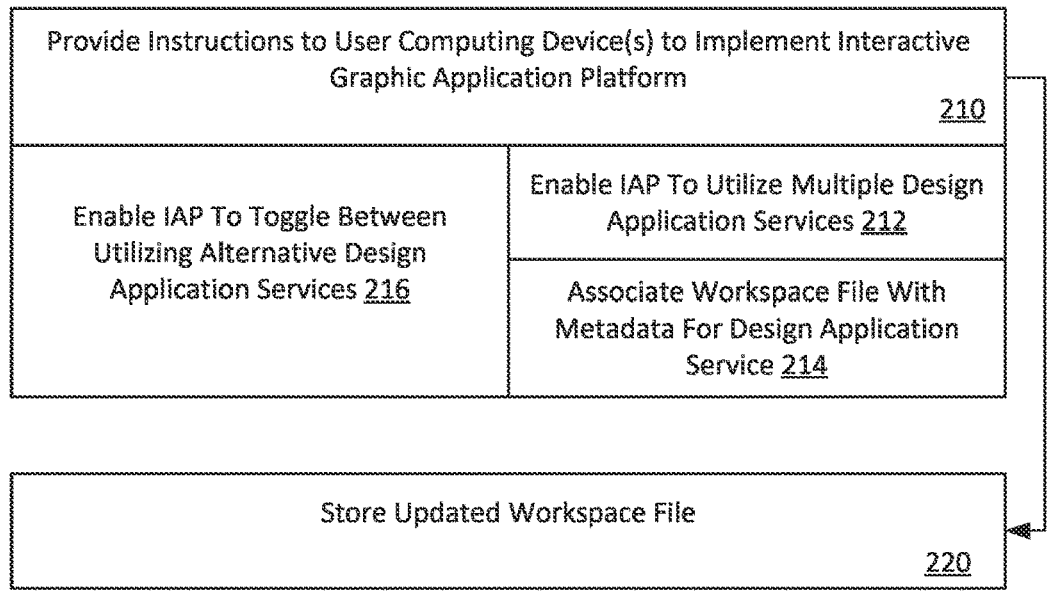
FIG. 2A illustrates a method for providing a graphic application design platform, according to one or more examples.
Figure 2B:
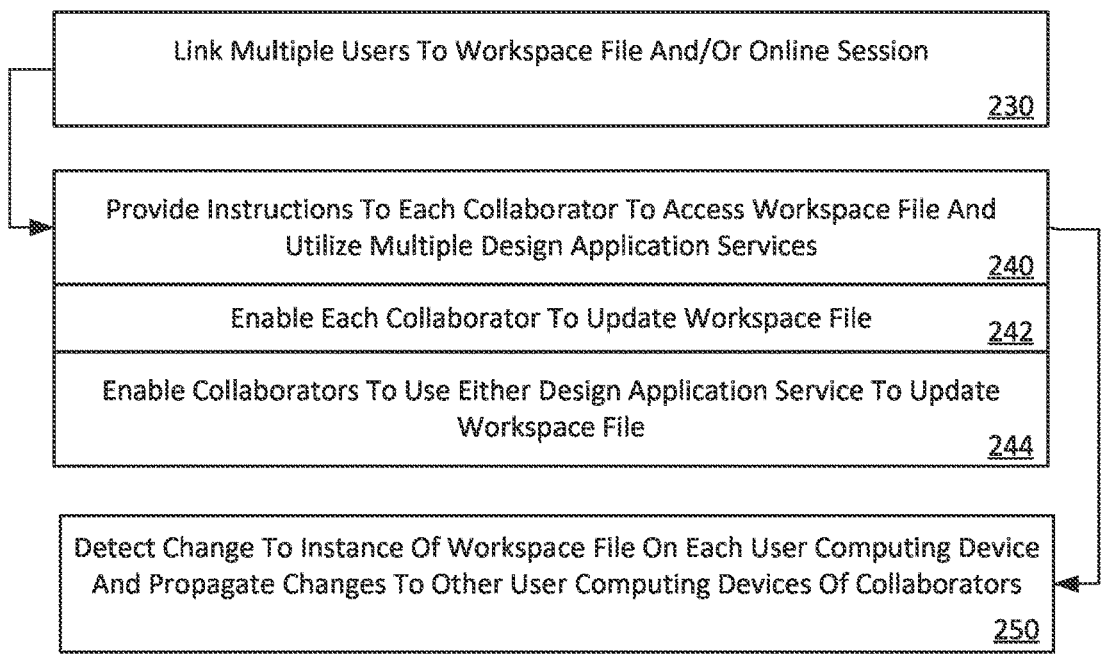
FIG. 2B illustrates a graphic application design platform for use in online collaboration, according to one or more examples.
Figure 2C:
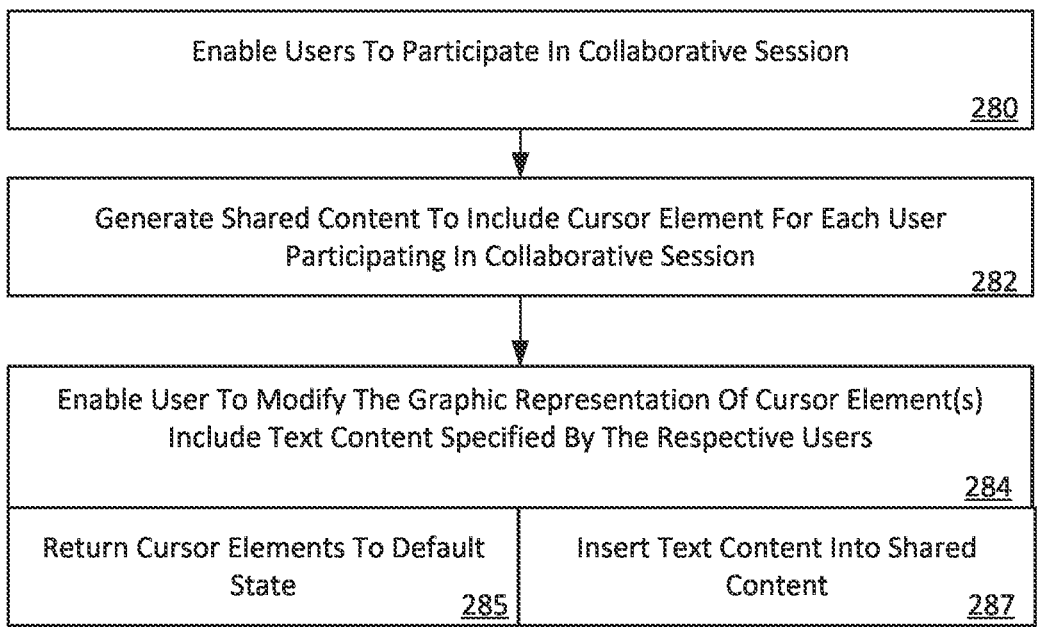
FIG. 2C illustrates a method for generating cursor text in a collaborative medium, according to one or more embodiments.
Figure 2D:
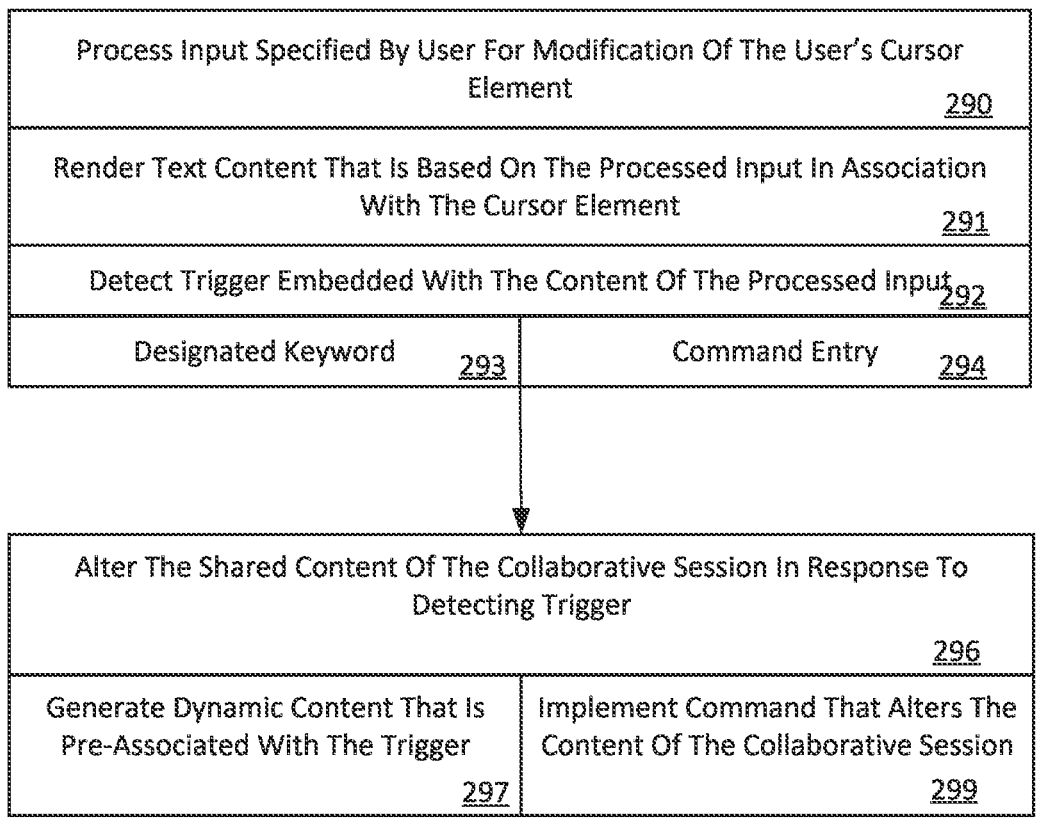
FIG. 2D illustrates a method for triggering dynamic content using triggers embedded in cursor texts, according to one or more embodiments.

FIG. 2A illustrates a method for providing a graphic application design platform, according to one or more examples. FIG. 2B illustrates a graphic application design platform for use in online collaboration, according to one or more examples. FIG. 2C illustrates a method for generating cursor text in a collaborative medium, according to one or more embodiments. FIG. 2D illustrates a method for triggering dynamic content using triggers embedded in cursor texts, according to one or more embodiments. In describing examples of FIG. 2A through FIG. 2D, reference is made to elements of FIG. 1A and FIG. 1B for purpose of illustrating suitable elements or components for performing a step or sub-step being described.

With reference to FIG. 2A, network computing system 150 operates to provide instructions to a user computing device (210), upon the user computing device accessing a network site or resource that is managed by the network computing system 150. Initially, the user computing device 10 can be associated with an account identifier (e.g., such as in response to the user or user computing device providing credentials). The user computing device 10 can be provided access to a collection of workspace files which are associated with the particular account. Alternatively, the user can create a workspace file to associate with the account. Each of the workspace files may be accessed by one or multiple application services provided through the IAP 100. For example, the network computing system 150 can provide a first application service for enabling the user to create an interactive graphic design for a functional user-interface, and a second design application service for enabling the user to create a whiteboard design space.

When a session is initiated in the manner described, the network computing system 150 can provide instructions for implementing the IAP 100 on the user computing device 10. When implemented, the IAP 100 can operate in multiple modes, where each mode coincides with use of one of the application services (212). Thus, in some examples, the IAP 100 may be able to operate in a first mode to utilize the first application service (e.g., integrated graphic design application), and in a second mode to utilize the second application service (e.g., whiteboarding application).

In examples, the user can access and open a workspace file associated with the user account. The workspace file can be associated with metadata that specifies the mode and design application service which is to be used by default to open the workspace file (214). For example, a workspace file can be provided with metadata that identifies the design service application (e.g., UI design or whiteboarding) that is to be used by default to open the particular workspace file. The metadata associated with the workspace file can determine the mode of operation for the IAP 100.

In variations, the user can toggle between modes to perform a file activity on the workspace file (216). The IAP 100 can be implemented to open a workspace file using a first application service (e.g., interactive graphic design application service). The rendering engine 120 of IAP 100 renders content from the opened workspace file on a corresponding canvas 122, in accordance with configurations and functionality provided with the application service logic 116 of the first application service. Further, the IAP 100 enables the user to utilize either of the service applications to update and/or interact with the content of the canvas 122. In some implementations, a workspace file can be associated initially or by default with one of the application services (e.g., whiteboarding application) and the IAP 100 can automatically implement the corresponding mode/default application service when the workspace file is opened to enable the user can then update the content and/or the workspace file using the default design application service. The user can also switch the operational mode of the IAP 100 to utilize the other (non-default) application service, in which case the rendering engine 120 utilizes the application service logic 116 of the other application service to process user input to update the content of the canvas 122 and/or the workspace file. In examples, the user can toggle between operational modes of the IAP 100 (and therefore between the design application services) when providing input to change the workspace file. The change between modes of the IAP 100 (and the design application service) can be seamless, in that the updates to the content and/or workspace file can be made while the workspace file is open and in a rendered state on the computing device 10.

Once the workspace file is updated, the updated workspace file can be stored in connection with the associated account of the user (220). In examples in which the workspace file is updated through online collaboration, the workspace file can be updated in real-time (or near real-time) by each collaborator that edits the workspace file.

With reference to FIG. 2B, multiple collaborators can be linked or otherwise associated with an online session where content is rendered on a shared canvas 122 (230). The shared content can be generated from, for example, a workspace file (or portion thereof). As an addition or variation, the shared content can be generated from input that is detected through user interactions with the canvas 122 and/or rendered content elements. In examples, the collaborators can be linked to a particular session, using a session or account identifier. In an aspect, a workspace file that is to be shared and collaborated on during the online session can also be linked to the session, such that the collaborators can operate respective user computing devices to view the content on the canvas 122.

The network computing system 150 can operate to provide instructions to a user computing device of each collaborator that accesses a network site of the network computer system (240). The instructions enable the computing device of each collaborator to (i) access one or more workspace files which are associated with the account or session identifier of the collaborators, and (ii) implement the IAP 100 to utilize multiple application services.

During an online session, each collaborator can utilize one of the application services (via the IAP 100 that is implemented on the respective user computer) to access an instance of a workspace file, to render content based at least in part on the workspace file and/or user input/interactions and to edit or update the content rendered on the canvas 122 and/or the workspace file (242). By way of example, when a whiteboarding application is utilized, each collaborator can view in real-time (or near real-time) design elements which are created by other collaborators on the shared canvas 122.

In some variations, collaborators can utilize alternative application services to update their respective instance of the workspace file (244). For example, individual users can change the mode of operation of the IAP 100 to utilize a different application service, and changes made by such users can be identified and propagated to the instances of the workspace files used on the computing devices of the other collaborators, irrespective of the design application service the other collaborators may be utilizing.

When any of the collaborators update their instance of the content and/or workspace file (e.g., provide input to add, change or delete a design element), the change to the instance is identified (250). In examples, the IAP 100 maintains a data representation 111 of the content rendered on the canvas 122 and/or workspace file. When one of the collaborators changes their instance of the workspace file, the change in the corresponding data representation is identified and propagated in real-time to the data representations 111 of the canvas content and/or workspace file on the computing device of the other collaborators (260). In this way, each collaborator views a synchronized rendering of the canvas content and/or workspace file in its most current state.

Additionally, the network computer system stores each update to the workspace file (270). For example, the network computer system 150 can maintain a data representation of the workspace file which is updated when changes are made by collaborators, and the data representation maintained by the network computer system 150 can reflect the state of the workspace file when, for example, the collaboration session ends.

With reference to FIG. 2C, network computing system 150 enables multiple users to participate in a collaborative session (280). As described with prior examples, each user of the collaborative session operates a computing device on which an interactive application platform ("IAP 100") is implemented. In some examples, the IAP 100 is implemented by a corresponding user computing device 10, 12 receiving web-resources 155 from the network computing system 150, where the web resources 155 include instructions, scripts and other logic (including application service logic 116) which is executable by browsers or web components of the respective user computing devices 10, 12.

The network computing system 150 generates shared content that includes graphic representations of pointer devices used by each participating user of the collaborative session (282). For example, the shared content can include canvas 122, on which whiteboarding content can be created and rendered. In this context, each user can operate a pointer device that move a cursor element about the canvas 122 (and surrounding regions), to, for example, hover (e.g., provide preselection input), select content objects or perform other interactions. In examples, the cursor element generated for each user forms part of the shared content of the collaborative session. The network computing system 150 operates to update the shared content that is rendered on each computing device, such that the shared content of the collaborative session shows cursor elements for each participating user. In examples, the network computing system 150 can track the movements of the cursor elements of different users in real-time (or near real-time).

Additionally, the IAP 100 enables each user to modify the graphic representation of the user's cursor element to include text content that is specified by the user (284). For example, the user can operate a keyboard or other input mechanism to modify the cursor element to include a textual message for other participants of the collaborative session (e.g., "Hi everyone, great to be here!"). The cursor element can then incorporate the message, such that the message moves about the canvas with the cursor element, responsive to the user's interaction with the pointer device. In this way, the modified cursor element provides an efficient mechanism for individual participants to communicate messages that are readily visible to all participants without requiring the other participants to look away or otherwise be distracted from the shared content.

In examples, when the user modifies their cursor element with text content, the modification remains for a given interval of time (e.g., 5 s) before the cursor element returns to a default state (e.g., line, icon, circle, etc.) (285). Still further, in some variations, the text content created by the user can be inserted into the shared content after a given time interval and/or in response to a given user input (287). For example, the text content can be inserted onto the shared canvas at a location of the user's cursor at the expiration of a given time interval or when user input (e.g., right-click) is received.

Accordingly, as described with examples of FIG. 2C, a user computing device that is participating in a collaborative session can be operated to enable the user to modify the graphic representation of the user's pointer device (e.g., cursor element) to include text content. For example, the user computing device 10, 12 can implement the IAP 100 to enable the user to participate in a collaborative session where there is shared content, and the user's modified cursor element is rendered as part of the shared content With reference to FIG. 2D, in response to the user interacting with the cursor element (or providing input that is designated to modify the cursor element), a user computing device 10, 12 processes the user input to modify the user's cursor element during the collaborative session (290). The user can, for example, operate a keyboard, voice-to-text interface or other alphanumeric input mechanism to enter text input. In variations, the user can specify a shortcut action, macro or otherwise select a pre-composed message.

The user computing device 10, 12 processes the user input by, in part, rendering text content that is based on the input in association with the cursor element as part of the shared content (291). In some implementations, the IAP is implemented to receive alphanumeric input via, for example, a process of the input interface 118, and the rendering engine 120 renders text content based on the input. Further, the rendering engine 120 links the text content with the cursor element for the user, such that movement of the cursor element also coincides with movement of the text content.

The user computing device 10, 12 also processes the input specified by the user to detect triggers embedded within the content of the input (292). In some implementations, the IAP 100 includes logic to scan, parse or otherwise analyze the text content for triggers.

In an example, the trigger can correspond to a designated keyword that is pre-associated with a content element or content-rendering action (293). Depending on implementation, one or multiple keywords may be designated as triggers.

As an addition or variation, the trigger can correspond to a command entry (294). The command entry can include a command marker, which may be in the form of a designated alphanumeric character or combinations thereof (e.g., "/"), followed by a string of characters that represent the command. Thus, when a command marker is detected, the computing device 10, 12 can, for example, match the subsequent term against commands of a command library to determine whether the text content specifies a command. If a command is detected, user computing device 10, 12 can automatically implement the command.

Accordingly, in examples, the user computing device 10, 12 alters the shared content of the collaborative session in response to detecting a trigger that is embedded in the text content modifying the user's cursor element (297). In some examples, the IAP 100 is implemented such that the rendering engine 120 automatically generates dynamic content that is pre-associated with the detected trigger (298). For example, the rendering engine can display a pre-associated icon or animation (e.g., dynamic icon, GIF rendering, etc.) with a keyword, and once the keyword is detected, the pre-associated content element is rendered. By way of illustration, if one of the participants of the collaboration session includes the message "Happy Birthday to John", the computing device 10, 12 may display a cake with candles flickering in iconic form or a row of balloons that move upward across the canvas 122. Accordingly, in some examples, the content rendered in response to detecting such triggers may be provided as (i) a separate layer from an underlying canvas 122 and/or other elements of the shared content, (ii) as a separate graphic element that is provided or integrated with the cursor element, (iii) separate or distinct from the text content and/or cursor element, or (iv) in a separate region that overlays the canvas 122, surrounding region (e.g., part of framework). Further, the content may be dynamic in that the rendered content may change appearance/position over time, such as to reflect movement of change of state.

As an addition or variation, the IAP 100 can detect and automatically implement a command entry to cause the shared content to be altered in accordance with a corresponding command. For example, a user can enter a command to invoke a programmatic element or interface. By way of illustration, the user can enter input that is detected to be a command entry that identifies a widget (e.g., "/voting"). In response, the IAP 100 can invoke a widget that generates a corresponding interactive content element as part of the shared content (e.g., interactive element to receive voting input from all participants). As another entry, the user can enter input that is detected to be a command entry that identifies another type of programmatic element (e.g., plugin, interface to other program). In response, the IAP 100 can render an interface for using the plugin as part of the shared content, or generate an output that is based on the detected command.

EXAMPLES

Figure 3A:
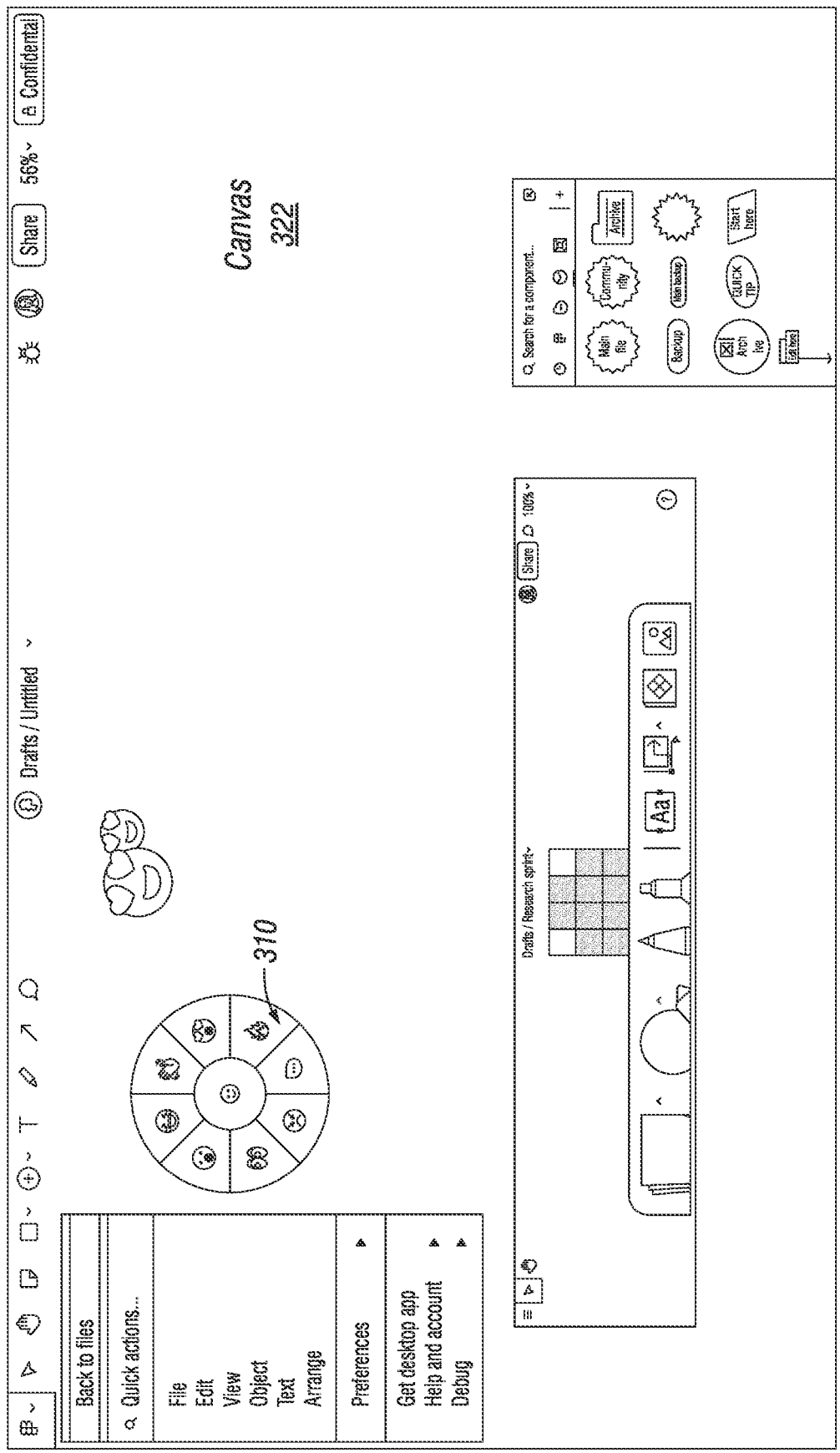
FIG. 3A and FIG. 3B illustrate examples of active workspaces which can be created and updated for a collaborative environment, according to one or more embodiments.
Figure 3B:
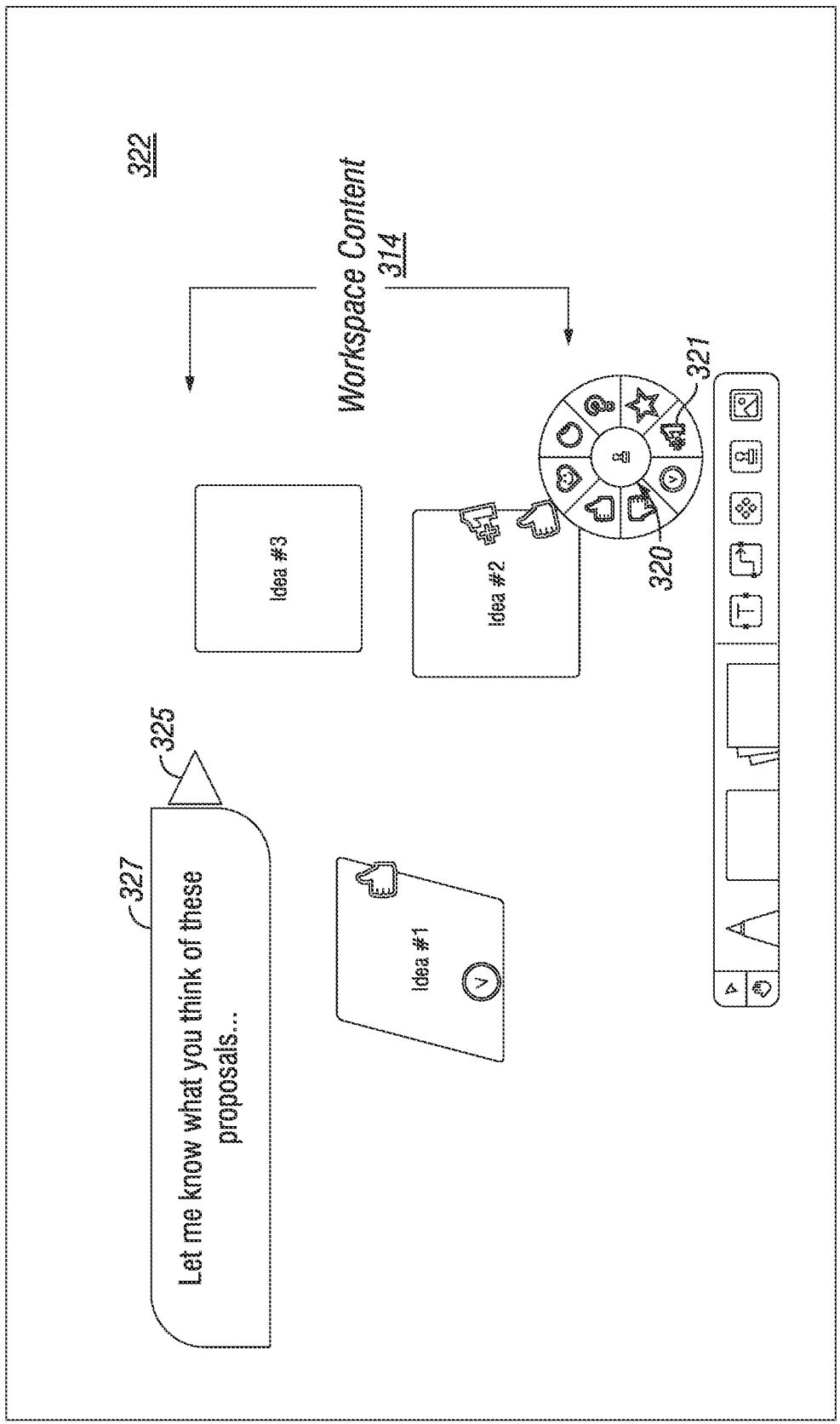
Figure 3C:
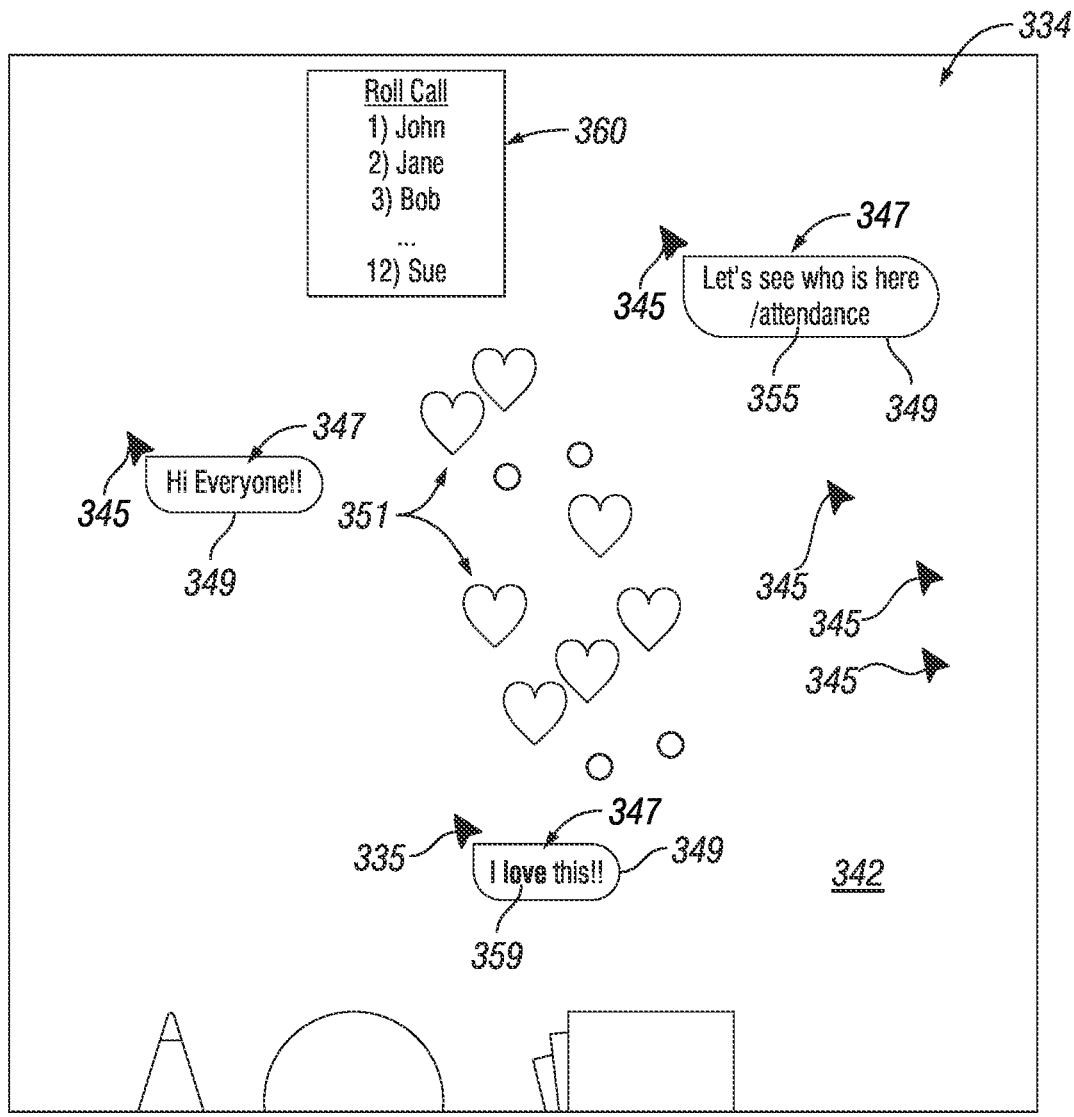
FIG. 3C illustrates an example of shared content of a collaborative medium that includes cursor text content, according to one or more embodiments.

FIG. 3A through FIG. 3C illustrate examples and variations of shared content for a collaborative environment, implemented using a whiteboarding application service, according one or more embodiments. In describing examples of FIG. 3A through FIG. 3C, reference is made to elements of FIG. 1A and FIG. 1B for purpose of illustrating a suitable component or element implementing the features being described. Further, while some examples are described which reference the whiteboard application service in context of computing devices 10, 12 which implement an interactive application platform 100, functionality described with the whiteboard application service can alternatively be implemented in a computing platform or environment without functionality for other application services. In particular, examples such as described with FIG. 3A through FIG. 3C (as well as FIG. 2C and FIG. 2D) can be implemented using network service applications or web-enabled applications for generating whiteboard content in a collaborative environment.

With reference to FIG. 3A, a workspace file is shown to be rendered on a display 302 of a user computing device 10, in connection with the user computing device utilizing a whiteboard application service to create and edit a whiteboard design 314. On an individual computing device 10, the IAP 100 can be implemented to create a canvas 322 which the user can interact with to view and edit a whiteboard design. In examples, the IAP 100 can render the canvas 322, as well as provide an application framework and input interface where the user can select and manipulate input tools to create design elements. In some examples, the design elements are specific to the whiteboard application. For example, the IAP 100 can be implemented to enable the user to select tools such as sticky notes, stamps, emoticons, shapes, images and text. The IAP 100 can further be implemented to provide menus and other features which enable the user to select attributes and characteristics for the design elements (e.g., color, line thickness, shape, text content, etc.). Some design elements may further be dynamic (e.g., dynamic emoticons). The IAP 100 can further configure some design tools specifically for a particular user. For example, as described in greater detail, the IAP 100 may provide an input tool that automatically includes an identifier for the user (e.g., letter initials, face picture) as an input feature which the user can select from.

In an example of FIG. 3A, the IAP 100 provides the whiteboard application service with an emoticon wheel 310. The emoticon wheel can be a feature that the user can toggle between an active (e.g., viewable) and inactive state. When the emoticon wheel is an active state, the emoticon wheel provides multiple input features to enable the user to select a particular emoticon or graphic. The IAP 100 can be further configured to enable selection of input features to be dynamic (e.g., moving emoticons on display 302).

FIG. 3B illustrates another example of a shared whiteboard content 314 that can be rendered and updated on the display 302 of user computing devices 10 that participate in a collaborative session. The whiteboard content 314 can be generated and rendered to participant computing devices that each implement the IAP 100. In the example provided, the whiteboard content 314 is provided text blocks, such as may be provided by a "sticky note" format and structure. Collaborators can contribute to the content of the whiteboard content 314 by creating and/or editing content elements (e.g., additional sticky notes), as well as by interacting with input features to create dynamic features (e.g., emoticons that move on the display 302). In an example of FIG. 3B, the user can also interact with a stamp wheel 320, to select pre-determined content elements ("stamps") that can be placed on the canvas 322. Any collaborator of whiteboard content 314 can select a stamp to communicate, for example, approval or disapproval of a particular message. In a collaborative environment, for example, different proposals may be posted onto the whiteboard content 314, and collaborators can vote on each proposal by indicating an approval or disapproval stamp.

Further, stamp wheel 320 illustrates an example of an input feature that can be automatically personalized for the user. For example, stamp wheel 320 can be configured to include a user-specific stamp 321 that can be selected to cause the whiteboard design 314 to render a design element that that is specific to the user (e.g., display the user's initial, the user's picture, or a favorite image selected by the user).

With further reference to an example of FIG. 3B, the whiteboard application service can also be used to create dynamic content in the form of text that is provided with an active collaborator's pointer graphic ("cursor text"). For example, each collaborator can interact with the whiteboard content 314 by moving a pointer 325 over an area of the canvas 322. The collaborator can interact with the whiteboard application service to specify text content that links with the pointer 325, resulting in cursor text 327. The cursor text 327 can be dynamic in that the text content may move over the canvas 322 with the user's pointer 325. Further, in some examples, the cursor 327 may be ephemeral, so as to last, a few seconds (e.g., 5-10 seconds). Further, in variations, the user can stamp text content 327 onto the canvas 322 so that the text content forms part of the whiteboard content 314.

FIG. 3C illustrates another example of a shared whiteboard content 334 that includes cursor text content, according to one or more embodiments. As with other examples, the shared whiteboard content 334 can be generated and rendered to participant computing devices using a whiteboard service application. The IAP 100 is implemented to display a cursor element 345 on the canvas 342 for individual participants who, for example, interact with their respective pointer device. Further as described with other examples (see e.g., FIG. 2C and FIG. 2D), the participants can specify input (e.g., via a keyboard) to alter the cursor elements 345 to include cursor text 347, where the text content can include, for example, a message that a corresponding user wishes to communicate to the other participants.

In an example shown by FIG. 3C, some of the participants are shown to provide text input to configure their respective cursor elements 345 (which reflect the interaction of their respective pointer device relative to the canvas 342) to include cursor text 347. Other participants who have not specified such type of input can be represented by cursor elements 345 without accompanying text content. Each cursor text 347 can include a boundary 349 and further be characterized by a select set of attributes (e.g., fill color, line thickness, text color, text font, size etc.). The boundary 349 can be dynamic, in that it may size to accommodate a length of the text content. For example, the boundary 349 can expand in either of a horizontal direction or vertical direction (e.g., to display multiple lines of text content). Further, as described with some examples, the text content may be ephemeral so as to automatically disappear after a given duration of time.

In the example shown, the cursor chat of a first user includes a keyword trigger 359 ("love"). In response to the detected keyword trigger, the shared content 334 is altered to include dynamic content elements 351 that are pre-associated with the particular keyword. The dynamic content elements 351 may be rendered, for example, as a separate layer, apart from the bounding region of the cursor text 347.

Additionally, in the example shown, the cursor text of a second user includes a command entry 355 ("/attendance"). The command entry implements a commands on the respective user's computing device, where the output of the command causes the shared content to be altered. Numerous types of commands may be utilized. By way of illustration, the command entry 355 triggers a widget to generate an interactive output 360 on the canvas 342. In an example shown, the widget is a program executable that automatically executes upon the command entry being entered. In the illustrative example, the widget executes to identify the name of each participant and lists the name in a bounding box on the canvas 342.

Figure 4A:
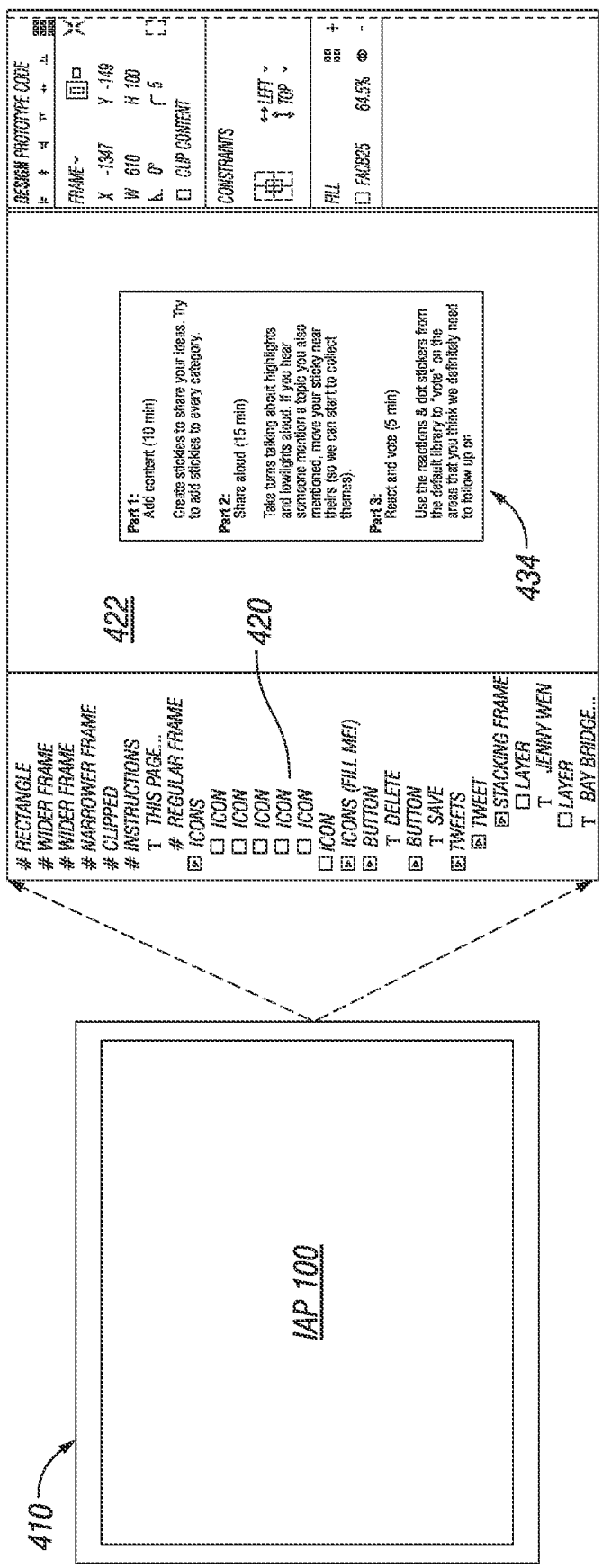
FIG. 4A and FIG. 4B illustrate an example of user computing device utilizing multiple design application services to render shared content in a collaborative environment, according to one or more embodiments.
Figure 4B:
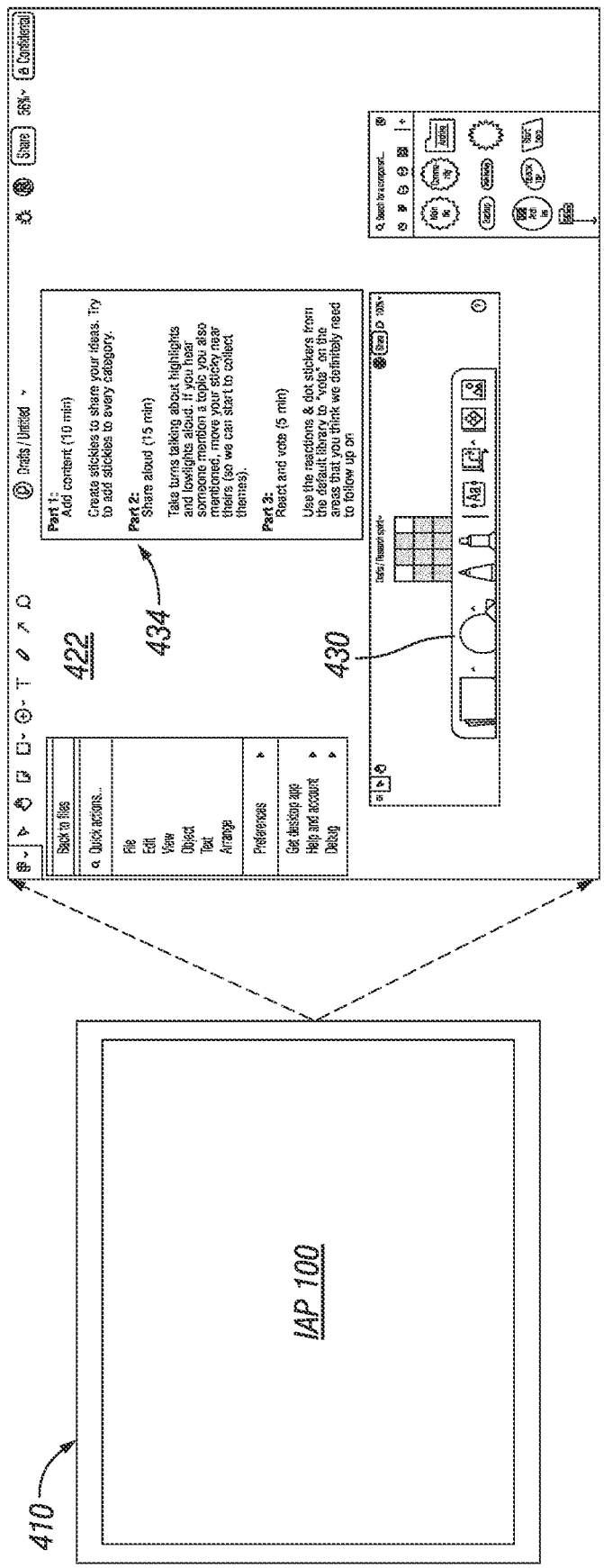

FIG. 4A and FIG. 4B illustrates an example of user computing device utilizing multiple application services to create and/or update shared content 434 in a collaborative environment, according to one or more embodiments. In an example shown, user computing device 410 (which is representative of other computing devices of the collaborative environment) accesses a network site to implement the IAP 100 and render interfaces for selected application services. As described with other examples, the IAP 100 can operate in alternative modes to utilize corresponding application services provided by network computer system 150 through the network site. Further, the IAP 100 can switch modes while the shared content 434 is continuously rendered on the computing device 410. For example, the IAP 100 can switch modes during a collaborative session while the user's computing device is accessing a workspace file that is the source of the shared content. Further, individual users can switch modes, so as to view and/or update the shared content 434 using a different application service than other users of the collaborative session. Moreover, as described with FIG. 4A and FIG. 4B, users can toggle back and forth between different application services while viewing or updating the shared content.

In an embodiment, the IAP 100 can enable the individual users to utilize each of a design interface application service and a whiteboarding application service. With reference to the illustrative example of FIG. 4A, the IAP 100 generates a canvas 422 for use with the design interface application services. When the design interface application service is used, the IAP 100 provides an input interface 420 and application framework of the design interface application.

With reference to the illustrative example of FIG. 4B, the IAP 100 is toggled to the whiteboarding application service. When the whiteboarding application service is used, the IAP 100 provides an input interface 430 and application framework that is specific to the whiteboarding application service. As shown, the input interfaces 420, 430 of the respective design interface and whiteboarding application services may differ in appearance, layout and functionality. For example, different types of input features may be provided with each input interface 420, 430. Accordingly, content elements which may be created by one application service may not be available for use by the other application service. Furthermore, the behavior (e.g., dynamic behavior versus static behavior) and default settings (e.g., color, line thickness) of design elements provided through the respective input interfaces 420, 430 may also be different. The functional behavior that may be enabled with design elements (e.g., resize behavior of design elements, autolayout behavior of design elements, use of constraints, etc.) can also vary based on the design application service that is in use by the user computing device 410.

As shown with FIG. 4A and FIG. 4B, the IAP 100 can be toggled on a given computing device 410 as between modes, where each mode coincides with a corresponding application service. Further, the IAP 100 can be toggled on the computing device 410 while shared content 434 is being rendered, coinciding with, for example, corresponding workspace file being open and in use by the IAP 100. Thus, for example, the IAP 100 may operate in (i) a first mode to enable use of the first application service (e.g., design application) and (ii) a second mode to enable use of the second application service (e.g., whiteboard application service). In implementing each mode, the IAP 100 can configure input features and behaviors of input actions/design elements for the respective design application service. Thus, the configuration and implementation of the input interface 118, application framework, rendering engine 120 and/or other components of IAP 100 can vary based on the selected application service and respective mode of operation of the IAP 100.

In some examples, the user can toggle the operational modes of the IAP 100 to switch the application service that is used to update the shared content that is rendered on the canvas 422. Thus, for example, the user can utilize the whiteboard application service to render a design on canvas 422, then toggle the operational mode of the IAP 100 to use the interactive design application service to update the same design on the canvas 422. Likewise, the user can utilize the design interface application service to render a design interface, then toggle the operational mode of the IAP 100 to use the whiteboard application service to update the design interface. In at least some examples, the IAP 100 and network computer 150 can update the respective workspace file without closing the workspace file. Furthermore, in a collaboration scenario, the update to the workspace file can be programmatically propagated to the instance of the workspace file on the user computing devices of the other collaborators.

Network Computer System

Figure 5:
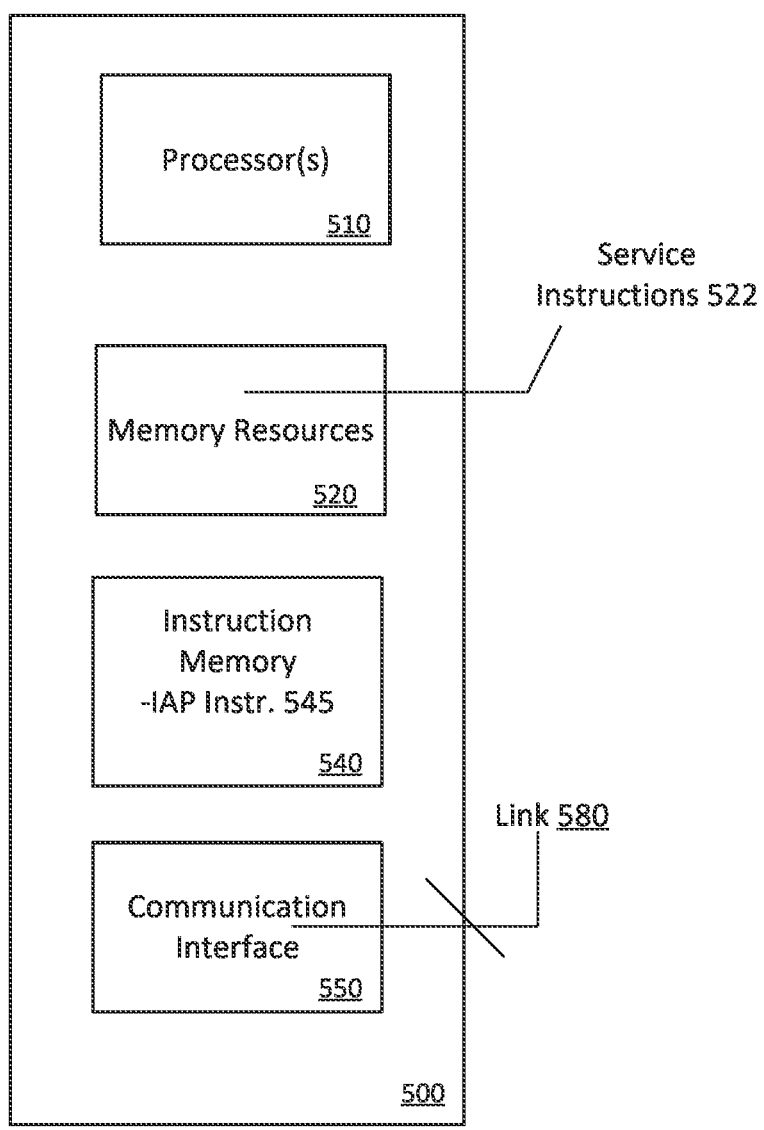
FIG. 5 illustrates a computer system on which one or more embodiments can be implemented.

FIG. 5 illustrates a computer system on which one or more embodiments can be implemented. A computer system 500 can be implemented on, for example, a server or combination of servers. For example, the computer system 500 may be implemented as the network computing system 150 of FIG. 1A and FIG. 1B.

In one implementation, the computer system 500 includes processing resources 510, memory resources 520 (e.g., read-only memory (ROM) or random-access memory (RAM)), one or more instruction memory resources 540, and a communication interface 550. The computer system 500 includes at least one processor 510 for processing information stored with the memory resources 520, such as provided by a random-access memory (RAM) or other dynamic storage device, for storing information and instructions which are executable by the processor 510. The memory resources 520 may also be used to store temporary variables or other intermediate information during execution of instructions to be executed by the processor 510.

The communication interface 550 enables the computer system 500 to communicate with one or more user computing devices, over one or more networks (e.g., cellular network) through use of the network link 580 (wireless or a wire). Using the network link 580, the computer system 500 can communicate with one or more computing devices, specialized devices and modules, and/or one or more servers.

In examples, the processor 510 may execute service instructions 522, stored with the memory resources 520, in order to enable the network computing system to implement the network service 152 and operate as the network computing system 150 in examples such as described with FIG. 1A and FIG. 1B.

The computer system 500 may also include additional memory resources ("instruction memory 540") for storing executable instruction sets ("IAP instructions 545") which are embedded with web-pages and other web resources, to enable user computing devices to implement functionality such as described with the IAP 100. In examples, the computer system 500 can communicate the IAP instructions 545 to computing devices of collaborators during a collaboration session.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 6:
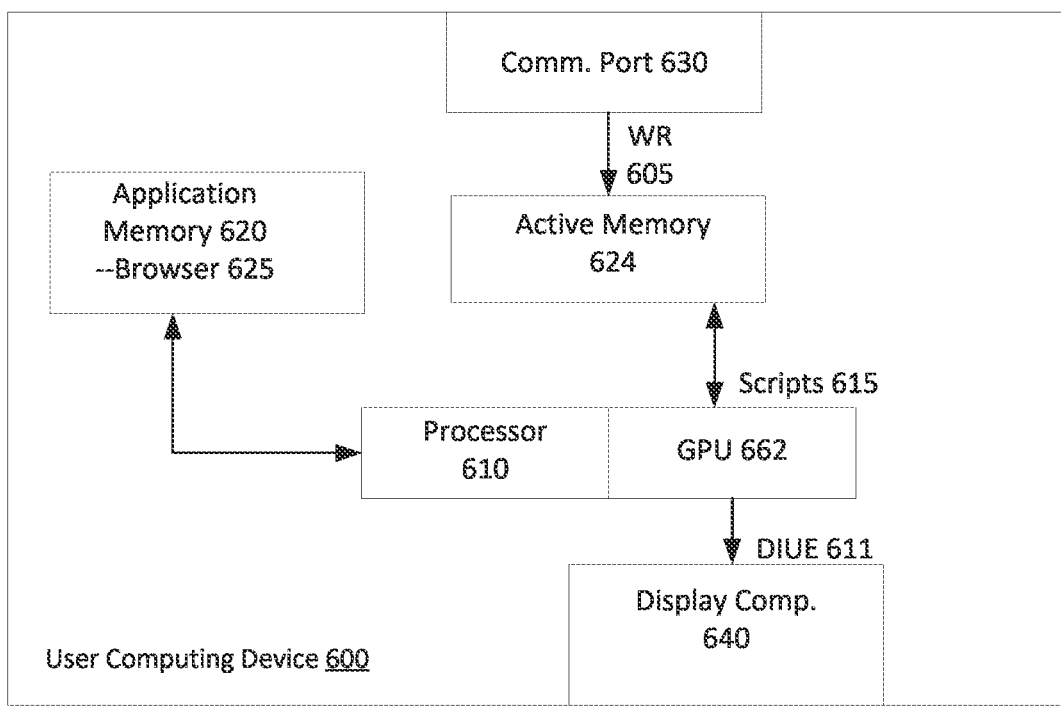
FIG. 6 illustrates a user computing device for use with one or more examples, as described.

FIG. 6 illustrates a user computing device for use with one or more examples, as described. In examples, a user computing device 600 can correspond to, for example, a workstation, a desktop computer, a laptop or other computer system having graphics processing capabilities that are suitable for enabling renderings of design interfaces and graphic design work. In variations, the user computing device 600 can correspond to a mobile computing device, such as a smartphone, tablet computer, laptop computer, VR or AR headset device, and the like.

In examples, the computing device 600 includes a central or main processor 610, a graphics processing unit 612, memory resources 620, and one or more communication ports 630. The computing device 600 can use the main processor 610 and the memory resources 620 to store and launch a browser 625 or other web-based application. A user can operate the browser 625 to access a network site of the network service 152, using the communication port 630, where one or more web pages or other resources 605 for the network service 152 (see FIG. 1A and FIG. 1B) can be downloaded. The web resources 605 can be stored in the active memory 624 (cache).

As described by various examples, the processor 610 can detect and execute scripts and other logic which are embedded in the web resource in order to implement the IAP 100 (see e.g., FIG. 1A and FIG. 1B). In some of the examples, some of the scripts 615 which are embedded with the web resources 605 can include GPU accelerated logic that is executed directly by the GPU 612. The main processor 610 and the GPU can combine to render a workspace file, or design under edit ("DUE 611") on a display component 640. The rendered design interface can include web content from the browser 625, as well as design interface content and functional elements generated by scripts and other logic embedded with the web resource 605. By including scripts 615 that are directly executable on the GPU 612, the logic embedded with the web resource 615 can better execute the IAP 100, as described with various examples.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A method for providing an application service, the method being implemented by one or more processors of a computing device and comprising:

enabling each computing device of a plurality of computing devices to participate in a collaborative session where shared content for an interactive graphic design is rendered on a collaborative medium that presents the interactive graphic design, wherein enabling each computing device of the plurality of computing devices to participate in the collaborative session comprises enabling a user of each computing device of the plurality of computing devices to use a corresponding pointer device to interact with the collaborative medium and provide updates to the interactive graphic design;

generating the shared content to include a graphic representation of the corresponding pointer device used by the user of each of the plurality of computing devices;

enabling the user of each of the plurality of computing devices to modify the graphic representation of the corresponding pointer device to include text content specified by the user of each computing device of the plurality of computing devices, the graphic representation of the corresponding pointer device expanding in at least one of a horizontal or a vertical direction based on the text content specified by the user of each computing device of the plurality of computing devices; and processing input specified by the user by (i) rendering the text content within the graphic representation of the corresponding pointer device used by the user, and (ii) detecting any one of multiple triggers embedded within the text content, wherein each of the multiple triggers is defined by a corresponding set of at least one alphanumeric character, wherein detecting any one of the multiple triggers includes detecting a command entry that identifies a voting widget that generates an interactive content element on the collaborative medium to receive voting input from the user of each of the plurality of computing devices, and wherein altering the shared content includes initiating the voting widget corresponding to the command entry on each of the plurality of computing devices.

2. The method of claim 1, further comprising:
for each of plurality of computing devices, moving the text content over the collaborative medium to coincide with movement of the corresponding pointer device of the user of each of the plurality of computing devices.

3. The method of claim 1, further comprising:
causing the text content to disappear automatically after a given time interval.

4. The method of claim 1, further comprising:
causing the text content to be stamped onto the collaborative medium automatically or in response to a user input.

5. The method of claim 1, wherein enabling the user of the plurality of computing devices to modify the graphic representation includes enabling each user to dynamically create the text content in response to input of that user.

6. The method of claim 1, wherein enabling each computing device of the plurality of computing devices to participate in the collaborative session includes communicating instructions to each computing device of the plurality of computing devices.

7. The method of claim 1, wherein enabling each computing device of the plurality of computing devices to participate in the collaborative session includes detecting a user interaction with the corresponding pointer device of the user of each of the plurality of computing devices, and updating a position of the corresponding pointer device with respect to the collaborative medium based on the user interaction.

8. The method of claim 7, wherein enabling each computing device of the plurality of computing devices to participate in the collaborative session includes detecting changes made to the interactive graphic design rendered with the collaborative medium on each computing device of the plurality of computing devices, and propagating the detected changes to other computing devices of the plurality of computing devices.

9. The method of claim 8, wherein detecting changes made to the interactive graphic design rendered with the collaborative medium on each computing device includes detecting, on each of the plurality of computing devices, movement and/or modification of the graphic representation.

10. The method of claim 1, wherein altering the shared content includes generating dynamic content separate from the rendered text content, wherein the dynamic content is pre-associated with a designated keyword detected in the text content.

11. A network computer system comprising:
a memory sub-system to store a set of instructions;
one or more processors that operate to communicate the set of instructions to a plurality of user devices, wherein the set of instructions include instructions that when executed by each user device of the plurality of user devices, causes the user device to:
enable each user device of the plurality of user devices to participate in a collaborative session where shared content for an interactive graphic design is rendered on a collaborative medium that presents the interactive graphic design, wherein enabling each user device of the plurality of user devices to participate in the collaborative session comprises enabling a user of each user device of the plurality of user devices to use a corresponding pointer device to interact with the collaborative medium;
generate the shared content to include a graphic representation of the corresponding pointer device used by the user of each user device of the plurality of user devices;
enable the user of each user device of the plurality of user devices to modify the graphic representation of the corresponding pointer device to include text content specified by the user of each user device of the plurality of user devices, the graphic representation of the corresponding pointer device expanding in at least one of a horizontal or a vertical direction based on the text content specified by the user of each user device of the plurality of user devices; and
process input specified by the user by (i) rendering the text content within the graphic representation of the corresponding pointer device used by the user, and (ii) detecting any one of multiple triggers embedded within the text content, wherein each of the multiple triggers is defined by a corresponding set of at least one alphanumeric character, wherein detecting any one of the multiple triggers includes detecting a command entry that identifies a voting widget that generates an interactive content element on the collaborative medium to receive voting input from the user of each of the plurality of user devices, and wherein altering the shared content includes initiating the voting widget corresponding to the command entry on each of the plurality of user devices.

12. The network computer system of claim 11, wherein the instructions executed by each user device of the plurality of user devices, further cause the user device to:
cause the text content to disappear automatically after a given time interval.

13. The network computer system of claim 11, wherein the instructions executed by each user device of the plurality of user devices, further cause the user device to:
cause the text content to be stamped automatically onto the collaborative medium automatically or in response to a user input.

14. A non-transitory computer-readable medium that stores instructions, which when executed by one or more processors of a computing device, cause the computing device to perform operations comprising:
enabling each computing device of a plurality of computing devices to participate in a collaborative session where shared content for an interactive graphic design is rendered on a collaborative medium that presents the interactive graphic design, wherein enabling each computing device of the plurality of computing devices to participate in the collaborative session comprises enabling a user of each computing device of the plurality of computing devices to use a corresponding pointer device to interact with the collaborative medium and provide updates to the interactive graphic design;
generating the shared content to include a graphic representation of the corresponding pointer device used by the user of each of the plurality of computing devices;
enabling the user of each of the plurality of computing devices to modify the graphic representation of the corresponding pointer device to include text content specified by the user of each computing device of the plurality of computing devices, the graphic representation of the corresponding pointer device expanding in at least one of a horizontal or a vertical direction based on the text content specified by the user of each computing device of the plurality of computing devices; and
processing input specified by the user by (i) rendering the text content within the graphic representation of the corresponding pointer device used by the user, and (ii) detecting any one of multiple triggers embedded within the text content, wherein each of the multiple triggers is defined by a corresponding set of at least one alphanumeric character, wherein detecting any one of the multiple triggers includes detecting a command entry that identifies a voting widget that generates an interactive content element on the collaborative medium to receive voting input from the user of each of the plurality of computing devices, and wherein altering the shared content includes initiating the voting widget corresponding to the command entry on each of the plurality of computing devices.

15. The non-transitory computer-readable medium of claim 14, wherein the operations further comprise:
causing the text content to disappear automatically after a given time interval.

16. The non-transitory computer-readable medium of claim 14, further comprising:
causing the text content to be stamped automatically onto the collaborative medium automatically or in response to a user input.

* * * * *